(12) United States Patent
Tachi

(10) Patent No.: US 10,656,889 B2
(45) Date of Patent: May 19, 2020

(54) IMAGE PROCESSING APPARATUS, CONTROL METHOD, AND STORAGE MEDIUM FOR MANAGING TRANSMISSION JOB HISTORY INFORMATION

(71) Applicant: CANON KABUSHIKI KAISHA, Tokyo (JP)

(72) Inventor: Daiki Tachi, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/955,134

(22) Filed: Apr. 17, 2018

(65) Prior Publication Data
US 2018/0232187 A1 Aug. 16, 2018

Related U.S. Application Data

(63) Continuation of application No. 14/741,862, filed on Jun. 17, 2015, now Pat. No. 9,977,638.

(30) Foreign Application Priority Data

Jun. 18, 2014 (JP) .................................. 2014-125728

(51) Int. Cl.
*G06F 3/12* (2006.01)
*H04N 1/00* (2006.01)

(52) U.S. Cl.
CPC .......... *G06F 3/1273* (2013.01); *G06F 3/1207* (2013.01); *G06F 3/1274* (2013.01); *G06F 3/1286* (2013.01); *H04N 1/00* (2013.01)

(58) Field of Classification Search
None
See application file for complete search history.

(56) References Cited

U.S. PATENT DOCUMENTS

| 8,286,003 B2 * | 10/2012 | Miyamoto | H04N 1/00127 |
| | | | 358/402 |
| 2009/0122342 A1 * | 5/2009 | Kawano | H04N 1/00244 |
| | | | 358/1.15 |
| 2014/0063527 A1 * | 3/2014 | Takagi | H04N 1/00344 |
| | | | 358/1.13 |
| 2014/0293335 A1 * | 10/2014 | Kikuchi | H04N 1/00925 |
| | | | 358/1.15 |

FOREIGN PATENT DOCUMENTS

JP          10065862 A   *   3/1998

* cited by examiner

*Primary Examiner* — Thomas D Lee
(74) *Attorney, Agent, or Firm* — Canon U.S.A., Inc. IP Division

(57) ABSTRACT

A multifunction peripheral (MFP) transmits, if the number of cases of accumulated non-transmitted history information has reached a predetermined number of cases or a designated transmission time has been reached, a communication management report (i.e., history information). When the MFP transmits the communication management report, the MFP inputs a transmission job in which deletion prevention information has been set on. Further, when performing a transmission process for processing the input transmission job, the MFP determines whether an error job clear function is executable on the job based on the deletion prevention information. If the error job clear function is not executable on the job, the MFP stands by for retransmission to be instructed by a user.

10 Claims, 13 Drawing Sheets

FIG. 2

| TRANSMISSION MANAGEMENT REPORT | |
|---|---|
| ■ REPORT OUTPUT METHOD | ● TRANSMIT  ○ PRINT ~201 |
| ■ TRANSMISSION DESTINATION | [server1.abc.com] ~202 |
| ■ AUTOMATICALLY OUTPUT WHEN DESIGNATED NUMBER OF CASES IS REACHED | ● ON  ○ OFF ~203 |
| ■ DESIGNATED NUMBER OF CASES | [100] CASES ~204 |
| ■ AUTOMATICALLY OUTPUT AT DESIGNATED TIME | ○ ON  ● OFF ~205 |
| ■ DESIGNATED TIME | [12:00] ~206 |
| [× CANCEL] ~212 | [OK] ~211 |

FIG. 4

| TRANSMISSION JOB QUEUE 400 | | | | | |
|---|---|---|---|---|---|
| RECEPTION NUMBER 401 | JOB NAME 402 | PROTOCOL 403 | DESTINATION ADDRESS 404 | DELETION PREVENTION 405 | STATUS 406 |
| 0407 | HISTORY TRANSMISSION | SMB | server1.abc.com | ON | STANDING BY 410 |
| 0408 | E-MAIL TRANSMISSION | Email | aaaa@abc.com | - | STANDING BY 411 |

FIG. 10

TRANSMISSION JOB STATUS CONFIRMATION SCREEN

| TIME | DESTINATION ADDRESS | STATUS |
|---|---|---|
| 13:00 | server.abc.com | ERROR |
| 13:05 | abcd@abc.co.jp | STANDING BY |

RETRANSMIT  DELETE  OK

FIG. 12

| TRANSMISSION JOB QUEUE 1200 | | | | | |
|---|---|---|---|---|---|
| RECEPTION NUMBER 401 | JOB NAME 402 | PROTOCOL 403 | DESTINATION ADDRESS 404 | SAVE DATA 1201 | STATUS 406 |
| 0407 | HISTORY TRANSMISSION | SMB | server1.abc.com | YES | STANDING BY 410 |
| 0408 | E-MAIL TRANSMISSION | Email | aaaa@abc.com | – | STANDING BY 411 |

IMAGE PROCESSING APPARATUS, CONTROL METHOD, AND STORAGE MEDIUM FOR MANAGING TRANSMISSION JOB HISTORY INFORMATION

CROSS REFERENCE TO RELATED APPLICATIONS

This application is a continuation application of U.S. patent application Ser. No. 14/741,862 filed on Jun. 17, 2015 which claims the benefit of Japanese Patent Application No. 2014-125728, filed Jun. 18, 2014, both of which are hereby incorporated by reference herein in their entirety.

BACKGROUND OF THE INVENTION

Field of the Invention

The present invention relates to an image processing apparatus including a function for managing history information, a control method of the image processing apparatus, and a storage medium.

Description of the Related Art

There is an image processing apparatus including a print function, a copy function, and a transmission function. Further, there is an image processing apparatus which manages history information, e.g., communication history. Such an image processing apparatus includes a report print function for automatically printing, when a predetermined amount of history (e.g., 50 cases) is accumulated, the history information as a report.

An administrator files and collectively manages the printed history information report and thus becomes capable of recognizing the way in which the image processing apparatus is used. Further, the administrator may generate an electronic version of the history information report and collectively manage the report on a file system in a personal computer (PC) or a server. To do this, the administrator uses a scanner and once reads the printed report and transmits the read data to a folder or an e-mail address thereof.

Furthermore, there is a technique in which the history information in the image processing apparatus is transmitted as an e-mail to service personnel according to a button operation by a user (refer to Japanese Patent Application Laid-Open No. 2010-34816).

Moreover, the image processing apparatus including the report print function for printing the history information report may also include a report transmission function for automatically transmitting the history information report to the administrator using the transmission function. The image processing apparatus performs the report printing function and automatically transmits the history information report to the administrator via e-mail transmission or file transmission. Electronic management of the history information thus becomes more convenient.

The history information used for outputting the report is temporarily stored in a buffer in the image processing apparatus. Since there is an upper limit on a buffer area storing such history information, when new history information is to be stored, old history information is overwritten by the new history information. As a result, if the history information is to be automatically outputted, it is necessary to securely output the old history information before being overwritten by the new history information.

On the other hand, the transmission function of the image processing apparatus generally deletes a transmission job when the transmission has been completed. Further, there is an image processing apparatus which also includes an error job clear function. The error job clear function automatically deletes the transmission job in the case where a failure has occurred in a network or the server, or a communication error has occurred due to an address input error. However, if there is a communication error when the history information report is automatically transmitted and the error job clear function deletes the transmission job for transmitting the report, the administrator cannot receive the history information. As a result, if the state in which the report cannot be transmitted to the administrator due to the communication error continues, the history information which has not been outputted may be overwritten by the new history information. In such a case, a portion of the history information becomes lost even if the administrator desires to manage all of the history information.

SUMMARY OF THE INVENTION

The present invention is directed to providing a method for preventing an administrator from becoming unable to obtain history information.

According to an aspect of the present invention, an image processing apparatus includes a reading unit configured to read a document and generate image data, a storing unit configured to store history information of a job, a generation unit configured to generate a job for transmitting data, a transmission unit configured to transmit data based on the job generated by the generation unit, a setting unit configured to set, in a case where transmission by the transmission unit has failed, whether to delete a job in which the transmission has failed, and a job control unit configured to, in a case where data to be transmitted by the transmission unit includes the history information, not delete a job regardless of a setting by the setting unit, and to control, in a case where the data to be transmitted by the transmission unit does not include the history information, whether to delete a job according to the setting by the setting unit.

Further features of the present invention will become apparent from the following description of exemplary embodiments with reference to the attached drawings.

BRIEF DESCRIPTION OF THE DRAWINGS

FIG. 2 illustrates an operation screen.

FIG. 4 illustrates a data model of a transmission job queue.

FIG. 10 illustrates an operation screen.

FIG. 12 illustrates a data model of the transmission job queue.

DESCRIPTION OF THE EMBODIMENTS

Various exemplary embodiments of the present invention will be described in detail below with reference to the drawings. The exemplary embodiments to be described below do not limit the scope of claims of the present invention, and not all of combinations of features described in the exemplary embodiments are necessary for a solution according to the present invention.

Figure 1:
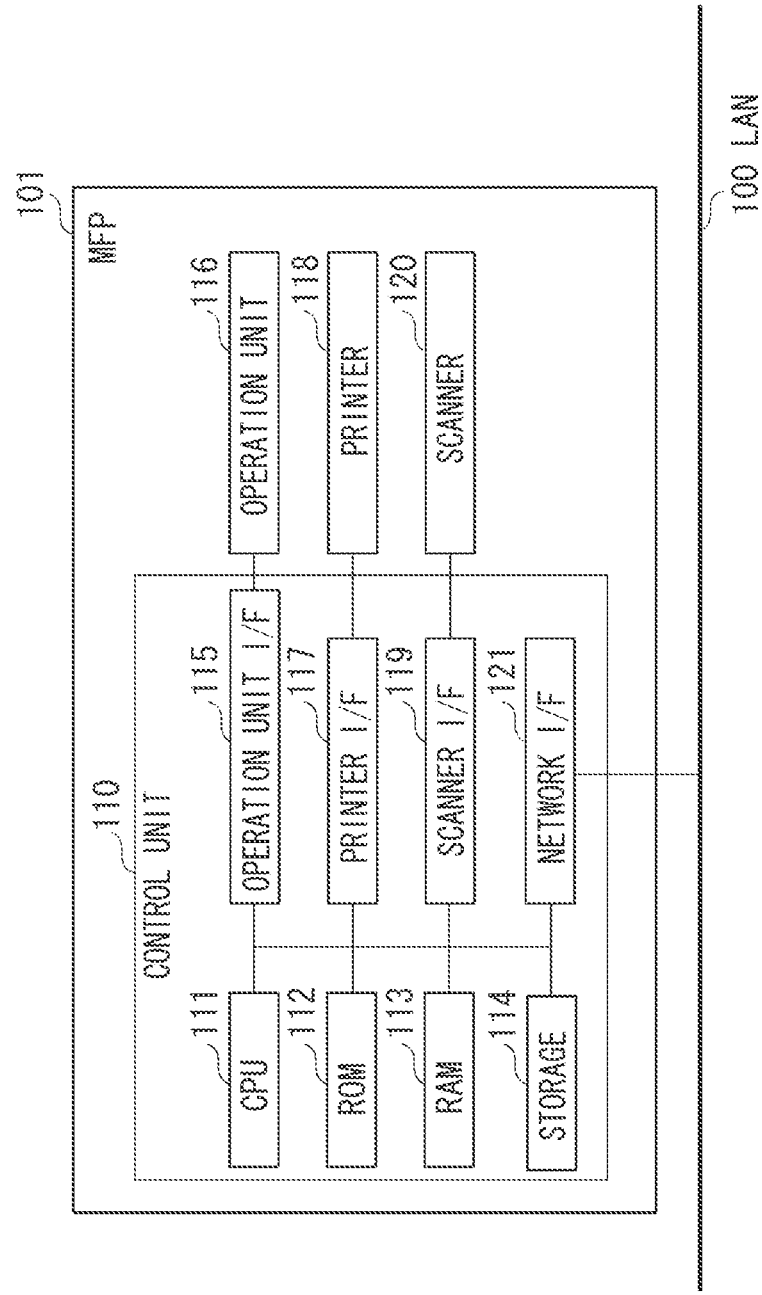
FIG. 1 is a block diagram illustrating a configuration of a multifunction peripheral (MFP) according to an exemplary embodiment of the present invention.

A first exemplary embodiment of the present invention will be described below. FIG. 1 is a block diagram illustrating a hardware configuration of an MFP 101. The MFP 101 is an example of the image processing apparatus. According to the present exemplary embodiment, the MFP will be described below as an example of an image processing apparatus. However, it is not limited thereto and may be any image processing apparatus other than the MFP as long as the apparatus includes a data transmission function.

Referring to FIG. 1, a control unit 110 including a central processing unit (CPU) 111 controls operations of the MFP 101. The CPU 111 reads control programs stored in a read-only memory (ROM) 112 or storage 114, and performs various types of control such as read control and transmission control. A random access memory (RAM) 113 is a main storage memory of the CPU 111 and is used as a work area or a temporary storage area for expanding the control programs stored in the storage 114. The storage 114 stores image data, various programs, various types of history information and various types of setting information. According to the present exemplary embodiment, the storage 114 is an auxiliary storage device such as a hard disk drive (HDD). However, the storage 114 may be a non-volatile storage device such as a flash disk represented by a solid state drive (SSD).

One CPU 111 in the MFP 101 performs each of the processes illustrated in the flowcharts to be described below using one memory (i.e., RAM 113). However, it is not limited thereto. For example, the MFP 101 may perform each of the processes illustrated in the flowcharts to be described below by a plurality of CPUs, RAMs, ROMs, and storages cooperating with one another. Further, a portion of the processes may be performed using a hardware circuit such as an application specific integrated circuit (ASIC) and a field-programmable gate array (FPGA).

An operation unit interface (I/F) 115 connects an operation unit 116 with the control unit 110. The operation unit 116 includes a liquid crystal display unit having a touch panel function and a keyboard, and functions as a receiving unit for receiving a user instruction and as a display unit for displaying information to a user.

A printer unit I/F 117 connects a printer 118 with the control unit 110. Image data to be printed by the printer 118 is transferred from the control unit 110 to the printer 118 via the printer I/F 117, and the printer 118 prints an image based on the image data on a sheet such as paper.

A scanner I/F 119 connects a scanner 120 with the control unit 110. The scanner 120 reads a document set on the MFP 101, generates image data (i.e., an image file), and transfers the generated image data to the storage 114 in the control unit 110 via the scanner I/F 119. The MFP 101 is capable of transferring the image data generated by the scanner 120 to the printer 118 and printing an image (i.e., perform a copy function). Further, the MFP 101 is capable of transmitting the image data generated by the scanner 120 using various transmission protocols (i.e., perform a transmission function). Furthermore, the MFP 101 is capable of storing the image data generated by the scanner 120 in the storage area readable and writable by the CPU 111 (i.e., perform a storage function). The control unit 110 is connected to a local area network (LAN) 100 via a network I/F 121. The network I/F 121 transmits the image data and the information to an external device (i.e., a mail server, a file server, or the PC) on the LAN 100 and receives the information from the external device on the LAN 100. Further, the MFP 101 may include a modem (not illustrated) and perform facsimile transmission and reception via a public switched telephone network (PSTN) (i.e., perform a facsimile function).

FIG. 2 illustrates an example of a management setting screen the control unit 110 displays on the operation unit 116. The administrator can specify output settings of communication management reports accumulated in the MFP 101 via the screen illustrated in FIG. 2. FIG. 2 illustrates an example of the setting in which the communication management report is transmitted to an address "server1.abc.com" every time 100 cases of non-transmitted history information become accumulated.

Referring to FIG. 2, radio buttons 201, 203, and 205 are for selecting one setting from a plurality of buttons (i.e., choices) and are used for setting conditions for outputting the communication management report. More specifically, the radio buttons 201 are used for selecting a method for outputting the communication management report. If a "transmit" button is selected, the MFP 101 is set to transmit the communication management report to the external device. If a "print" button is selected, the MFP 101 is set to print the communication management report with the printer 118.

An area 202 is for inputting a destination to which the communication management report is to be transmitted. If the area 202 is selected, a screen for receiving input of the destination is displayed. The administrator then inputs destination information via the displayed screen, so that the destination to which the communication management report is to be outputted can be set. According to the present exemplary embodiment, an e-mail address can be set as the destination. Further, the MFP 101 is capable of setting a folder in the file server or the PC as the destination. In such a case, the MFP 101 can transmit the communication management report to a folder by using a transmission protocol such as the Server Message Block (SMB), the File Transfer Protocol (FTP), and the Distributed Authoring and Versioning protocol for the WWW (WebDAV).

When the destination is set via the area 202, the MFP 101 may perform a connection test with the destination for preventing a communication error due to an error in inputting the destination information. In such a case, sample data is transmitted to the set destination to confirm whether the data is transmissible. If the transmission fails, a message such as "there is an error in the destination information" is displayed, and the MFP 101 receives re-input of the destination. On the other hand, if the transmission is successful, the input destination information is set as the destination for outputting the communication management report.

The radio buttons 203 are used for selecting whether to automatically output the communication management report by setting the number of cases of history information. If an "ON" button is selected, the MFP 101 is set to automatically output the communication management report when the number of cases of non-outputted history information stored in a communication history buffer 600 to be described below has become a designated number or greater. On the other hand, if an "OFF" button is selected, the MFP 101 is set not to output the communication management report according to the condition based on the number of cases of non-transmitted history information. An area 204 is for inputting the designated number of cases. If the area 204 is selected, the number of cases of history information to be a threshold value of automatic transmission can be set via the displayed screen or ten keys provided as hard keys outside the screen of the operation unit 116.

The radio buttons 205 are used for selecting whether to automatically output the communication management report according to time designation. If an "ON" button is selected, the MFP 101 is set to output the communication management report at a designated time. If an "OFF" button is selected, the MFP 101 is set not to output the communication management report according to the condition based on time. An operation key 211 is for applying the output setting which has been input. If the operation key 211 is pressed, the output setting which has been input is applied as the setting information of the MFP 101. An operation key 212 is for cancelling the output setting which has been input.

Figure 3:
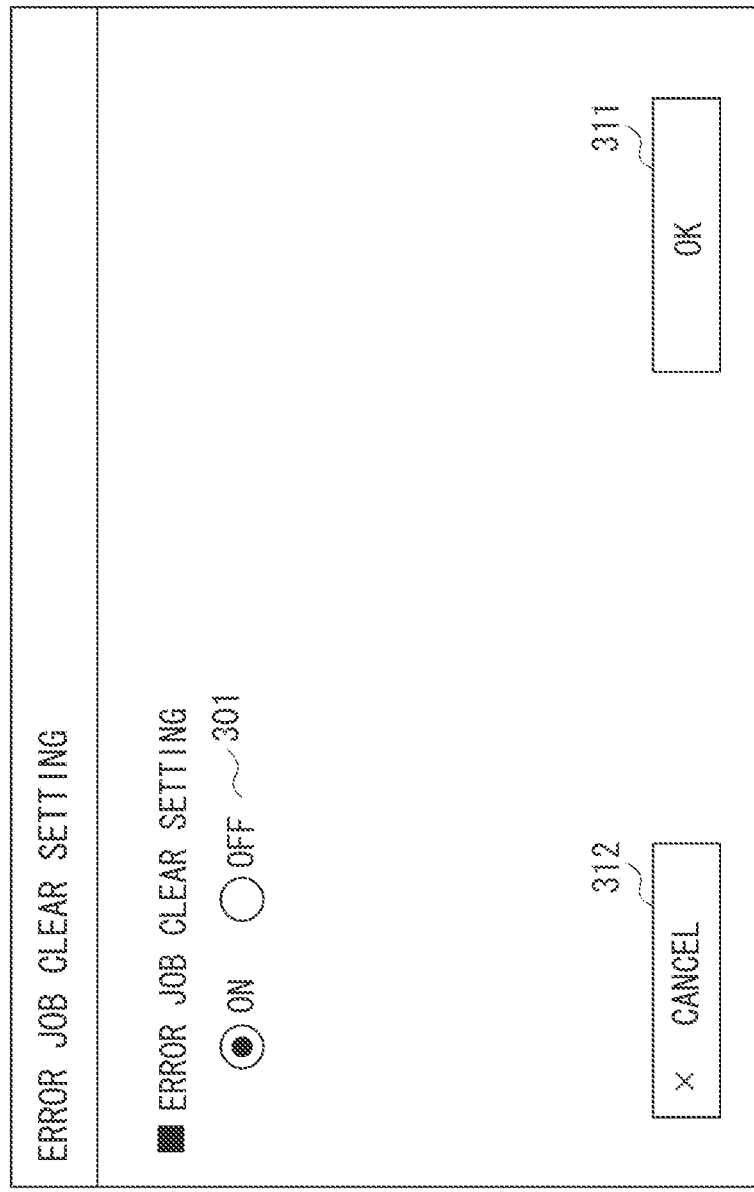
FIG. 3 illustrates an operation screen.

FIG. 3 illustrates an example of a setting screen the control unit 110 displays on the operation unit 116. The user is capable of setting, via the screen illustrated in FIG. 3, whether to validate a function (i.e., an error job clear function) for deleting a transmission job when the communication error has occurred in the transmission job. Referring to FIG. 3, radio buttons 301 are for selecting one setting from the plurality of buttons (i.e., choices) and are used for setting whether to validate the error job clear function. If an "ON" button is selected, the error job clear function is valid, and the MFP 101 is set to delete, when the communication error has occurred in the transmission job, the transmission job in which the communication error has occurred. If an "OFF" button is selected, the error job clear function is invalid, and the MFP 101 is set not to delete, when the communication error has occurred in the transmission job, the transmission job and cause the transmission job to stand by as an error job. An operation key 311 is for applying the setting. If the operation key 311 is pressed, the setting is stored in the storage 114 or the RAM 113. An operation key 312 is for cancelling the setting.

Upon the user starting to use the MFP 101, a setting screen (not illustrated) for setting a process to be executed is displayed. The user sets a job via the operation unit 116 and presses a start key outside of the screen. The user can thus execute a transmission job, a print job, and a copy job. For example, if the user instructs execution of the transmission job, the CPU 111 generates the transmission job according to the setting and inputs the transmission job to a transmission job queue 400 illustrated in FIG. 4. Further, if the user instructs execution of the print job or the copy job, the print job or the copy job is input to a print job queue (not illustrated).

FIG. 4 illustrates an example of a data structure of the transmission job queue 400 which manages the transmission job, stored in the storage 114 or the RAM 113. The CPU 111 manages the execution of a plurality of transmission jobs based on the transmission job queue 400. The CPU 111 executes a transmission process in order from the transmission job previously input to the transmission job queue 400. Upon completing the execution of the transmission job, the CPU 111 deletes the transmission job from the transmission job queue 400.

Referring to FIG. 4, information 401 indicates a reception number assigned when starting execution of the transmission job. Information 402 indicates a name of the transmission job. Information 403 indicates a transmission protocol used for performing transmission. Information 404 indicates the destination information. Information 405 indicates deletion prevention information for determining whether the error job clear function is to be executed on the transmission job. If "ON" is set as the information 405, the job is not a job to be deleted based on the error job clear function. If "ON" is not set as the information 405, the transmission job is a job to be deleted based on the error job clear function. In the example illustrated in FIG. 4, the case where "ON" is not set to the information 405 is indicated using "-".

Information 406 indicates a status of the transmission job. For example, "standing by", "transmitting", or "error" is stored in the information 406. "Standing by" is information indicating that the transmission job is in a transmissible state. "Transmitting" is information indicating that the transmission process to be described below is being executed. And, "error" is information indicating that the transmission job is remaining in a transmission error state. The CPU 111 overwrites the information in the information 406 according to an execution status of the transmission job. According to the present exemplary embodiment, the execution of the transmission job is managed using each of the information indicated in the information 401 to information 406. However, it is not limited thereto. For example, other fields may be included, such as a user name indicating the user executing the job or date and time the job is input.

<Main Routine of MFP 101>

Figure 5:
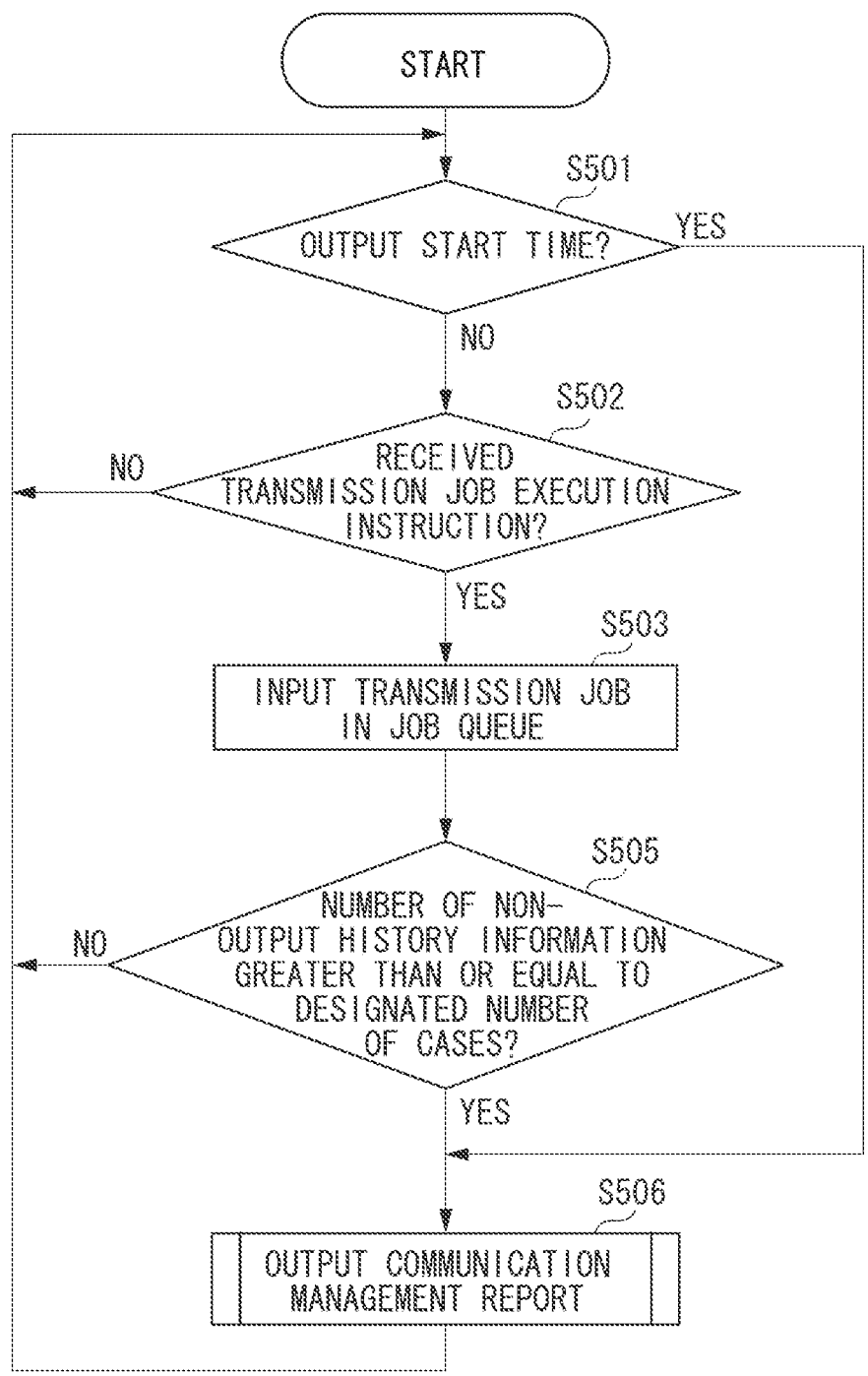
FIG. 5 is a flowchart illustrating a main routine.

FIG. 5 is a flowchart illustrating an operation related to the transmission function of the MFP 101. The MFP 101 receives a transmission job execution instruction via the operation unit 116 and executes the transmission job. Further, the MFP calls an event for outputting the communication management report based on a setting value previously set on a communication management report output setting screen (illustrated in FIG. 2).

Each of the operations (i.e., steps) illustrated in the flowchart of FIG. 5 is realized by the CPU 111 in the MFP 101 executing the control program stored in the ROM 112 or the storage 114.

In step S501, the CPU 111 determines whether a communication management report output start time has been reached. If the CPU 111 determines that the communication management report output start time has been reached (YES in step S501), the process proceeds to step S506. In step S506, the CPU 111 outputs the communication management report. On the other hand, if the CPU 111 determines that the communication management report output start time has not been reached (NO in step S501), the process proceeds to step S502. In step S502, the CPU 111 determines whether the transmission job execution instruction has been received. If the transmission job execution instruction has been received (YES in step S502), the process proceeds to step S503. If the transmission job execution instruction has not been received (NO in step S502), the process returns to step S501, and the CPU 111 stands by for timer interruption of the communication management report based on time designation and for the transmission job execution start instruction.

In step S503, the CPU 111 inputs the transmission job in the transmission job queue 400. The execution of the transmission job input to the transmission job queue will be described below with reference to the flowchart illustrated in FIG. 8. Upon executing the transmission job in step S503, the process proceeds to step S505. In step S505, the CPU 111 determines whether the number of cases of non-outputted history information has reached the designated number of cases. If the CPU 111 determines that the number of cases of non-outputted history information stored in the communication history buffer 600 to be described below has reached the designated number of cases (YES in step S505), the process proceeds to step S506. In step S506, the CPU 111 outputs the communication management report. If the CPU 111 determines that the number of cases of non-outputted history information is less than the designated number of cases (NO in step S505), the process returns to step S501 and the CPU 111 stands by for output of the communication management report and for input of the job.

The communication management report output start time is determined in the case where the setting is "ON" for automatically outputting the communication management report by time designation. If the setting is "OFF", the determination in step S501 is not performed. Further, the determination in step S505 is performed in the case where the setting is "ON" for automatically outputting the communication management report by designating the number of cases of history information. If the setting is "OFF", the determination in step S505 is not performed.

Figure 6:
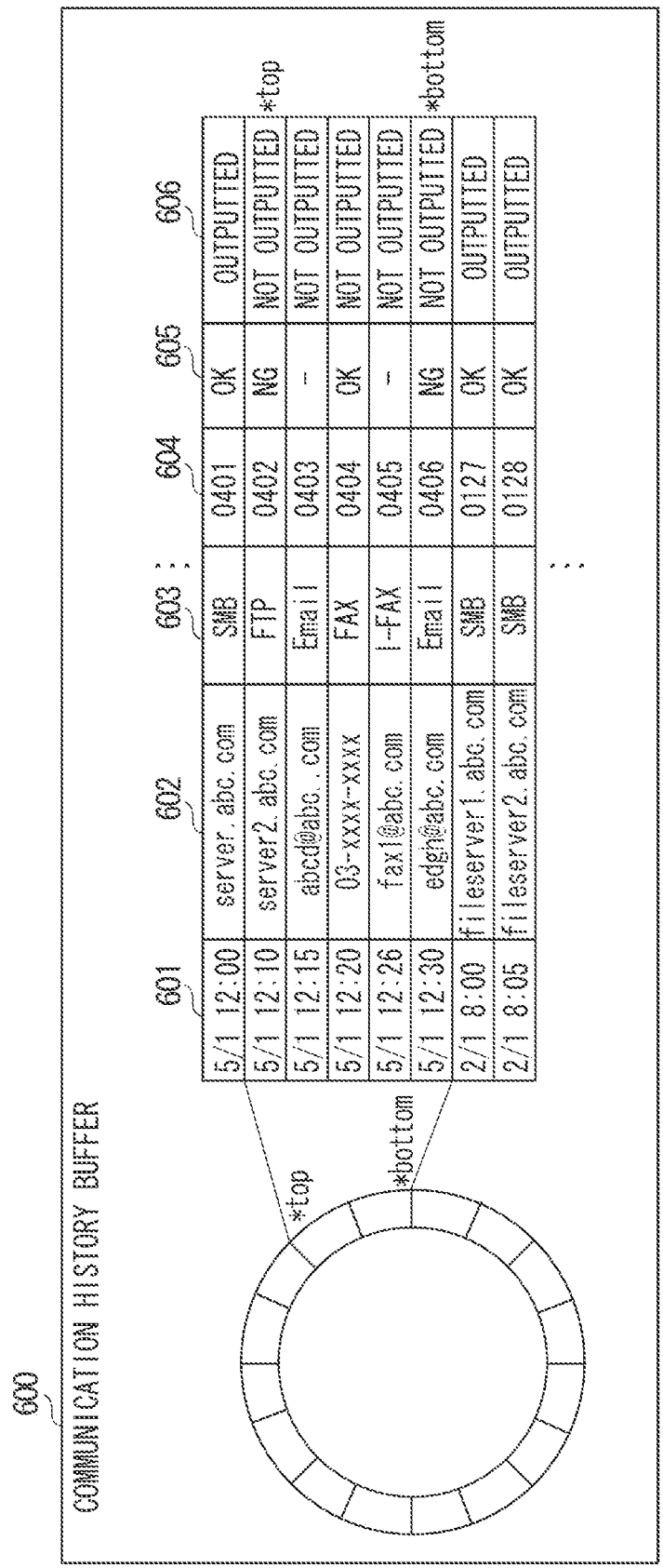
FIG. 6 illustrates a data model of a communication history buffer.

FIG. 6 illustrates an example of a data structure of the communication history buffer 600 for temporarily storing the history information, stored in the storage 114 or the RAM 113. Referring to FIG. 6, information 601 indicates transmission start time. Information 602 indicates the destination information. Information 603 indicates the transmission protocol used in the transmission. Information 604 indicates the reception number assigned when execution of the transmission job has started. Information 605 indicates a transmission result, and if the transmission is successful, "OK" is stored therein. On the other hand, if the transmission has failed, "NG" is stored therein. In the case where E-mail transmission is performed, "NG" is stored when an error mail or an error response code is received from a mail server. If the error mail or the error response code is not received, "-" which indicates that the transmission to the server or the addressed destination has not been confirmed is stored as the information 605.

Information 606 indicates an output status, i.e., whether the history information has been outputted as the communication management report, and is stored associated with each of the history information. If the history information has been outputted as the communication management report, "outputted" is stored as the information 606, and if the history information has not yet been outputted, "not outputted" is stored as the information 606.

There is an upper limit to the storage area of the communication history buffer 600 (e.g., 2000 cases). A trailing end and a leading end of a buffer area for temporarily storing the data are thus connected, and the buffer area is circularly used. According to the present exemplary embodiment, an index top indicates a top position of the non-outputted history information and an index bottom indicates an end position of the non-outputted history information.

The CPU 111 accesses the communication history buffer 600 and performs history management. When storing the new history information, the old history information is overwritten by the new history information. For example, if execution of a transmission job of the reception number "0407" is newly completed, the CPU 111 increments the index bottom indicating the end position of the history information. The CPU 111 then determines a storing position of the history information based on the incremented index bottom and stores the history information corresponding to the transmission job of the reception number "0407" therein.
<Communication Management Report Output Process>

Figure 7:
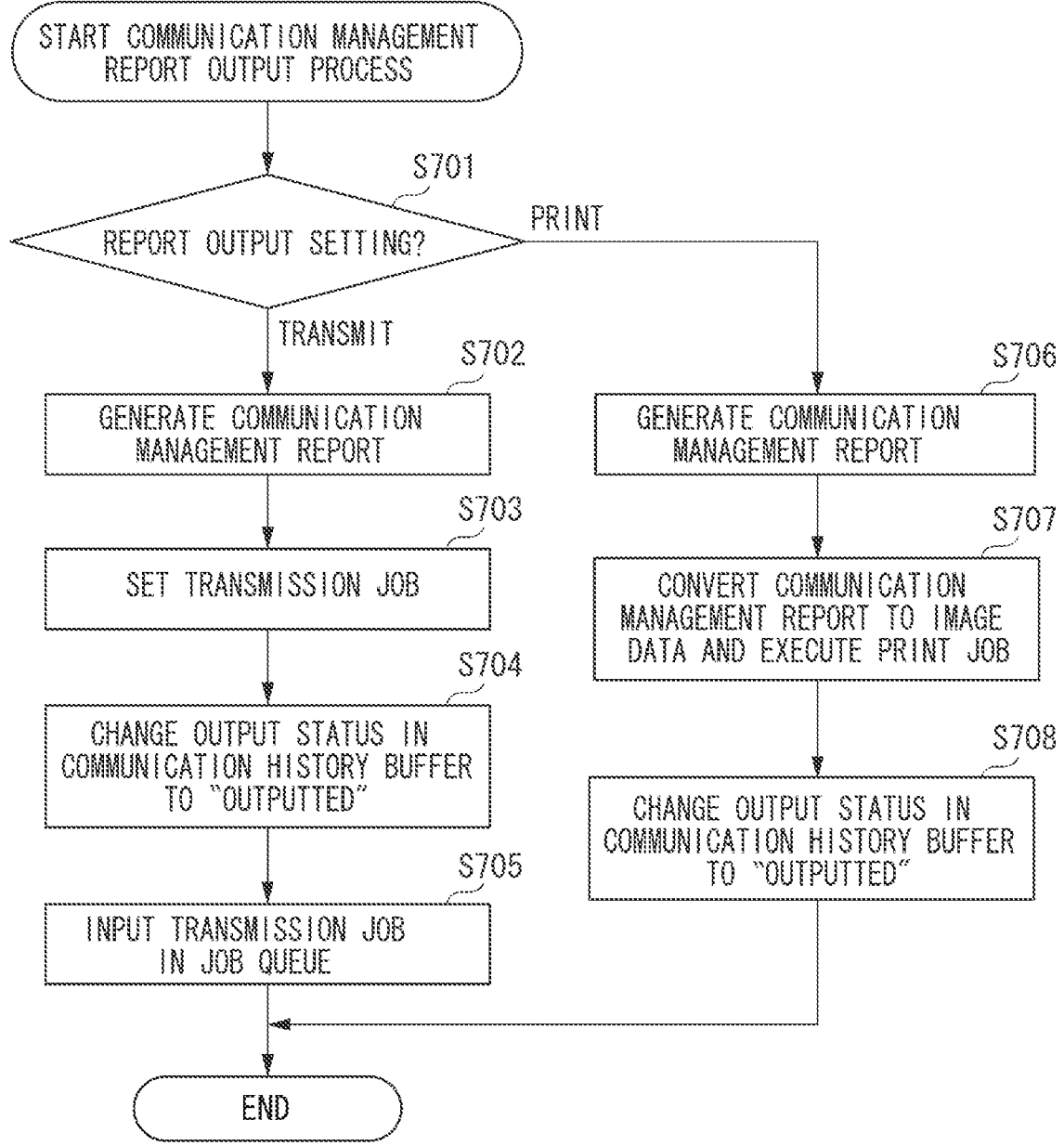
FIG. 7 is a flowchart illustrating a report output operation.

FIG. 7 is a flowchart illustrating in detail a communication management report output process performed in step S506 of the flowchart illustrated in FIG. 5. Each of the operations (i.e., steps) illustrated in the flowchart of FIG. 7 is realized by the CPU 111 in the MFP 101 executing the control program stored in the ROM 112 or the storage 114.

In step S701, the CPU 111 determines the setting of a communication management report output method. If the MFP 101 is set to transmit the communication management report to the external device ("TRANSMIT" in step S701), the process proceeds to step S702. On the other hand, if the MFP 101 is set to print the communication management report on the printer 118 therein ("PRINT" in step S701), the process proceeds to step S706.

The case where the MFP 101 is to print the communication management report will be described below. In step S706, the CPU 111 obtains all of the history information in which "not outputted" is stored as the information 606 from the communication history buffer 600. The CPU 111 then generates the communication management report in which the obtained history information is included.

In step S707, the CPU 111 converts the communication management report generated in step S706 to image data for printing on the printer 118 and executes a print job for printing the image data. Upon execution of the print job, the printer 118 prints an image based on the communication management report on a recording medium such as a sheet. When the print job for printing the communication management report is completed, the process proceeds to step S708. In step S708, the CPU 111 overwrites the information 606 corresponding to the history information included in the communication report generated in step S707 to "outputted" and ends the communication management report output process.

The case where the MFP 101 is to transmit the communication management report to the external device will be described below. In step S702, the CPU 111 obtains all of the history information in which "not outputted" is stored as the information 606 from the communication history buffer 600. The CPU 111 then generates the communication management report in which the obtained history information is included. A data format of the communication management report generated in step S702 may be the above-described image data or text data separated by commas such as comma separated values (CSV). Further, the data may be a portable document format (PDF) document, a HyperText Markup Language (HTML) document, or an Extensible Markup Language (XML) document. Furthermore, the data may be a database file usable in a database management system.

In step S703, the CPU 111 specifies the settings of the transmission job for transmitting the communication management report to the destination which has been preset via the setting screen illustrated in FIG. 2. More specifically, the CPU 111 sets the destination of the communication management report and the transmission protocol based on the transmission information preset on the communication management report output setting screen (illustrated in FIG. 2). Further, the CPU 111 sets the communication management report generated in step S702 as the data to be transmitted. Furthermore, the CPU 111 sets the deletion prevention information (i.e., the information 405 illustrated in FIG. 4) as an optional setting of the transmission job.

In step S704, the CPU 111 overwrites the information 606 corresponding to the history information written in the communication management report generated in step S702 to "outputted".

In step S705, the CPU 111 generates a transmission job based on the settings specified in step S703, inputs the generated transmission job to the transmission job management queue 400, and ends the communication management report output process. The transmission job input to the transmission job queue is transmitted based on a flowchart of the transmission process illustrated in FIG. 8.

According to the present exemplary embodiment, the process of step S704 is executed after specifying the settings of the transmission job. However, it is not limited thereto. For example, the process of step S704 may be executed when generating the report in step S702. Further, the output status may be changed to "outputted" after inputting the transmission job to the transmission job queue 400 in step S705.

<Transmission Process>

The CPU 111 performs transmission in order from the previously input transmission job based on the transmission job queue 400.

Figure 8:
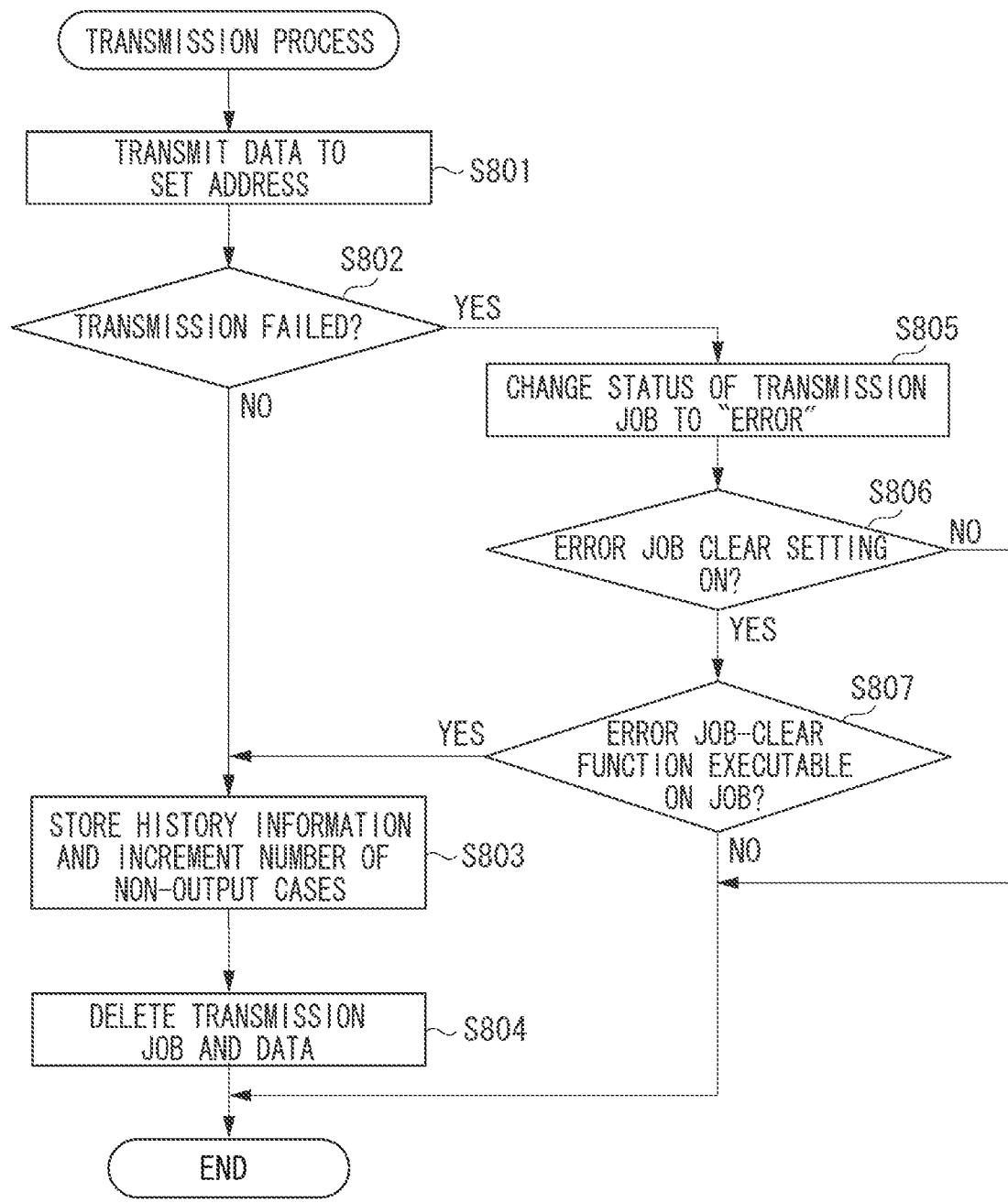
FIG. 8 is a flowchart illustrating a transmission operation.

FIG. 8 is a flowchart illustrating transmission control performed when transmitting data. The CPU 111 refers to the transmission job queue 400 and starts the transmission process in the case where there is a transmission job standing by.

According to the present exemplary embodiment, the case where the transmission jobs 410 and 411 illustrated in FIG. 4 are input to the transmission job queue 400 and the transmission process corresponding to the transmission job 410 is to start will be described as an example. Each of the operations (i.e., steps) illustrated in the flowchart of FIG. 8 is realized by the CPU 111 in the MFP 101 executing the control program stored in the ROM 112 or the storage 114.

In step S801, the CPU 111 uses the communication protocol "SMB" set to the transmission job 410 and transmits data to be transmitted to the address "server1.abc.com". If the CPU 111 cannot transmit the data, the CPU 111 automatically retries the transmission a predetermined number of times (e.g., three times).

In step S802, the CPU 111 determines whether the transmission performed in step S801 has failed. If CPU 111 cannot transmit the data even when the transmission has been retried for the predetermined number of times, the CPU 111 determines that the transmission has failed (YES in step S802). The process then proceeds to step S805. If the CPU 111 has been able to transmit the data, the CPU 111 determines that the transmission has not failed (the transmission has succeeded) (NO in step S802), and the process proceeds to step S803.

In step S803, the CPU 111 stores the history information of the executed transmission job in the communication history buffer 600 and increments the number of cases of history information which has not been outputted.

In step S804, the CPU 111 deletes the transmission job from the transmission job queue 400 and the transmission process ends. When the transmission job is deleted, the data that has been transmitted by the transmission job is similarly deleted. The deletion of the transmission job indicates deletion of the transmission job from the transmission job queue 400 and the data corresponding to the transmission job.

On the other hand, in step S805, the CPU 111 changes the status (i.e., the information 406) of the transmission job being executed to "error". In step S806, the CPU 111 determines whether the error job clear function is valid. If the error job clear function setting is "ON", the CPU 111 determines that the error job clear function is valid (YES in step S806), and the process proceeds to step S807. If the error job clear function setting is "OFF", the CPU 111 determines that the error job clear function is not valid (i.e., invalid) (NO in step S806). The transmission process then ends while the transmission job remains as the error job.

In step S807, the CPU 111 determines whether the error job clear function can be performed on the transmission job being executed. More specifically, the CPU 111 determines the value of the deletion prevention information (i.e., information 405) set to the transmission job being executed. If the deletion prevention information is "ON" (NO in step S807), the transmission process ends while the transmission job remains as the error job. On the other hand, if the deletion prevention information is not "ON" (YES in step S807), the process proceeds to step S803, and the CPU 111 stores the history information. In step S804, the CPU 111 deletes the transmission job from the transmission job queue 400 and deletes the transmitted data. The transmission process then ends.

<Retransmission of Error Job>

The MFP 101 includes a transmission job confirmation function for confirming the status of the transmission job standing by for execution, the transmission error job which has been executed, or the transmission job being executed. For example, the user can confirm the transmission job input to the transmission job queue 400 by pressing a job status key (not illustrated) included as the hard key outside of the screen.

Further, by selecting a transmission job, the user can instruct deletion or retransmission of the selected transmission job.

Figure 9:
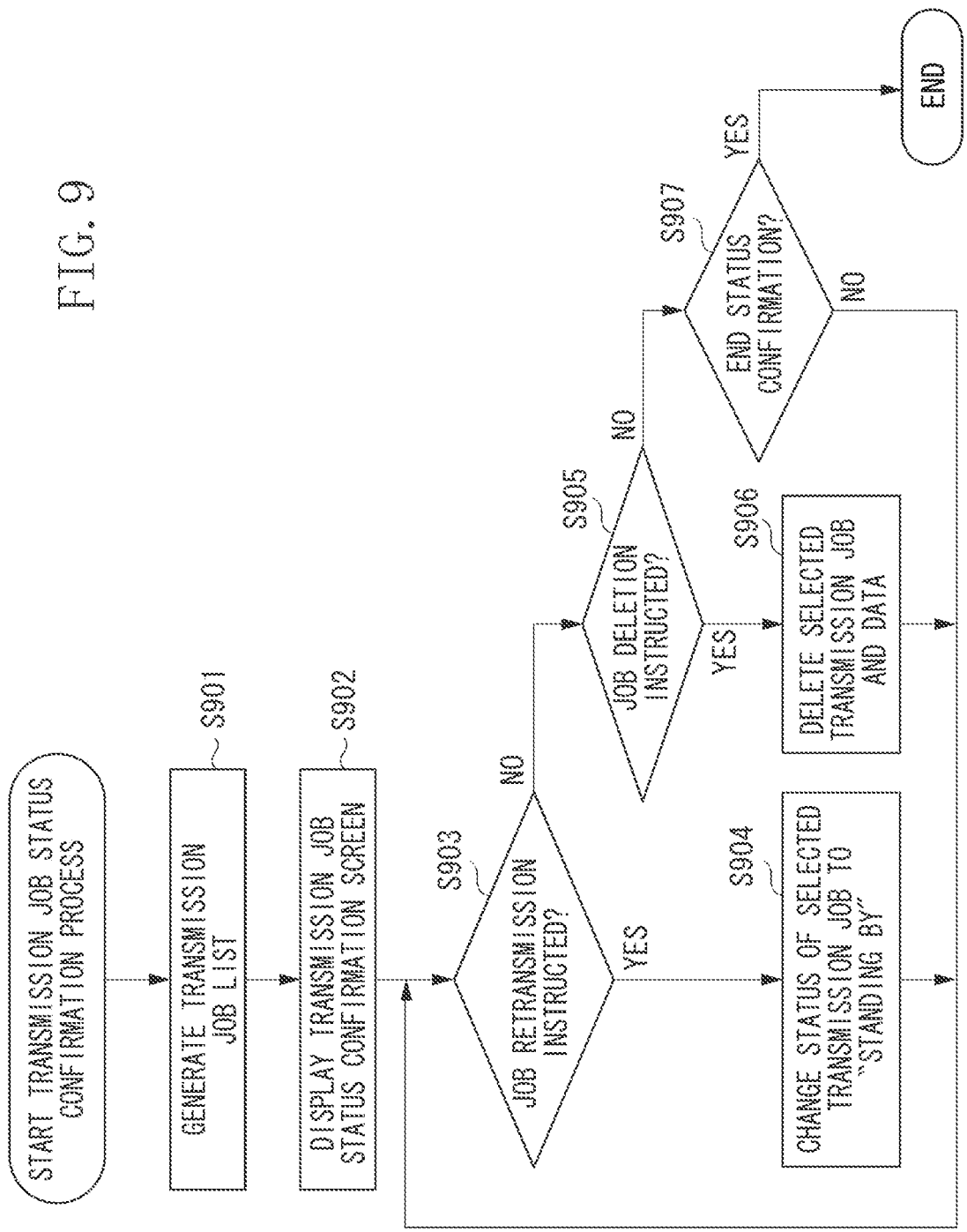
FIG. 9 is a flowchart illustrating a job status confirmation operation.

FIG. 9 is a flowchart illustrating a process for controlling transmission job status confirmation. Upon detecting that the user has pressed the job status key (not illustrated) included as the hard key outside of the screen, the CPU 111 executes the transmission job status confirmation process.

According to the present exemplary embodiment, the case where the transmission jobs 410 and 411 are input in the transmission job queue 400 and the transmission process corresponding to the transmission job 410 is to start will be described as an example.

Each of the operations (i.e., steps) illustrated in the flowchart of FIG. 9 is realized by the CPU 111 in the MFP 101 executing the control program stored in the ROM 112 or the storage 114.

In step S901, the CPU 111 obtains a list (i.e., a transmission job list) of the transmission job standing by for execution, the transmission error job which has been executed, and the transmission job being executed input in the transmission job queue 400. In step S902, the CPU 111 displays a transmission job status confirmation screen on the operation unit 116 based on the transmission job list obtained in step S901.

FIG. 10 illustrates an example of the transmission job status confirmation screen displayed on the operation unit 116, indicating the state in which a transmission job 1001 has been selected. The user can confirm the execution status of the transmission job input to the MFP 101 via the screen illustrated in FIG. 10. Referring to FIG. 10, information 1000 indicates a list of transmission job information. The information 1000 displays the list of job information such as the time the job has been input, the transmission protocol, the destination, and the job status to the user. The user can then select a transmission job from the job list via the operation unit 116.

Further, an operation key 1012 is used when retransmitting the selected transmission job. An operation key 1013 is for deleting the selected transmission job. An operation key 1014 is for closing the transmission job status confirmation screen and ending the transmission job confirmation.

In step S903 of the flowchart illustrated in FIG. 9, the CPU 111 determines whether retransmission of the transmission job has been instructed via the transmission job status confirmation screen illustrated in FIG. 10. If the CPU 111 detects that the user has pressed the operation key 1012, the CPU 111 determines that the retransmission of the transmission job has been instructed (YES in step S903). The process then proceeds to step S904. In step S904, the CPU 111 changes the status of the transmission job in the transmission job queue 400 corresponding to the transmission job information selected by the user to "standing by". The CPU 111 retransmits, based on the transmission process illustrated in the flowchart of FIG. 8, the transmission job which the status thereof has been changed to "standing by" in step S904.

On the other hand, if the user has not pressed the operation key 1012, the CPU 111 determines that the retransmission of the transmission job has not been instructed (NO in step S903). The process then proceeds to step S905. In step S905, the CPU 111 determines whether the user has instructed to delete the transmission job via the transmission job status confirmation screen illustrated in FIG. 10. If the CPU 111 detects that the user has pressed the operation key 1013, the CPU 111 determines that the user has instructed to delete the transmission job (YES in step S905), and the process proceeds to step S906. In step S906, the CPU 111 deletes the transmission job corresponding to the transmission job information selected by the user from the transmission job queue 400 and the transmitted data. The transmission process then ends. If the deletion prevention information (i.e., the information 405 illustrated in FIG. 4) of the transmission job is "ON", the transmission job may be caused not to be deleted even if the user has pressed the operation key 1013. Further, the user having an authority of management of the MFP 101 may be caused to be the only user allowed to delete the job in which the deletion prevention information is "ON".

If the operation key 1013 is not pressed, the CPU 111 determines that the user has not instructed to delete the transmission job (NO in step S905), and the process proceeds to step S907.

In step S907, the CPU 111 determines whether to end the transmission job status confirmation. If the CPU 111 detects that the operation key 1014 has been pressed, the CPU 111 ends the transmission job status confirmation (YES in step S907). If the operation key 1014 is not pressed, the process returns to step S903, and the CPU 111 stands by for a user instruction. The instruction using the operation key 1014 has been described as an example of the instruction for ending the transmission job status confirmation. However, it is not limited thereto. For example, the CPU 111 may be triggered to end the transmission job status confirmation in the case where the job status key (not illustrated) provided as the hard key outside of the screen is repressed, or in the case where the screen returns to an initial screen (i.e., performs auto clear) according to elapsing of time.

As described above, when the MFP 101 is to transmit the communication management report, the MFP 101 generates the transmission job to which the deletion prevention information is added (i.e., refer to FIGS. 5 and 7) and inputs the transmission job to the transmission job queue 400. The input transmission job is transmitted to the destination based on the flowchart illustrated in FIG. 8. Since the error job clear function (i.e., process of step S805) is not performed on the transmission job to which the deletion prevention information is added, the job can be caused to remain as the error job even if the transmission has failed.

If the transmission job to which the deletion prevention information is added becomes an error job (i.e., NO in step S807), the transmission job being executed may be changed to a time-designated job in addition to performing the above-described control operation. The time-designated job is a transmission job set to be transmitted when the designated time has been reached. In such a case, it is desirable to change the job to the time-designated job in which the transmission starts after the network or a transmission destination device has recovered from the failure. For example, the job is changed to the time-designated job in which the transmission is performed a day after.

Further, if the CPU 111 determines that the error job clear setting is on (YES in step S806) and a job type is history transmission based on the job name (information 402), the MFP 101 may be caused to print the communication management report. Furthermore, if the MFP 101 includes a storage box for storing image data read using the scanner 120 and for reusing the image data, the MFP 101 may store the communication management report in the storage box.

According to the present exemplary embodiment, the case where the history information of the transmission job is outputted as the communication management report has been described as an example. However, it is not limited thereto. For example, the communication management report including the history information on the transmission job and the history information on a received job may be collectively outputted.

Further, the present exemplary embodiment may be applied to the case where a print management report with respect to a print job or a copy job is to be transmitted to the external device. Furthermore, the present invention may be applied to the case where the history information temporarily stored in the MFP 101 is to be automatically transmitted to the external device. An example is transmitting a storage management report with respect to a storing job for scanning image data and storing the scanned data in a box in the MFP 101. Moreover, the present invention is applicable to the case where the history information is manually transmitted by a user operation on a screen (not illustrated) displaying the job history information.

As described above, according to the present exemplary embodiment, the transmission job for transmitting the history information can be prevented from being automatically deleted even if the communication error has occurred when performing the transmission process. The user is capable of selecting the transmission job for transmitting the history information and of instructing retransmission. By such a method, the history information can be transmitted without exception. Further, the transmission job for transmitting the history information can be retransmitted by designating the time. As a result, highly convenient history information transmission can be realized.

A second exemplary embodiment according to the present invention will be described below. According to the present exemplary embodiment, if the communication error occurs when performing transmission, a file corresponding to the history information report is saved in the area for storing texts in the storage 114. The saved file is transmitted when transmitting the subsequent report. Such a history information transmission process will be described below. Detailed description on the configurations similar to the first exemplary embodiment will be omitted.

The CPU 111 executes the process of the flowchart illustrated in FIG. 5, receives a transmission job execution instruction via the operation unit 116, and executes the transmission job similarly as the first exemplary embodiment. Further, the MFP 101 outputs the communication management report in step S506 based on the setting value preset on the communication management report output setting screen (illustrated in FIG. 2).

<Communication Management Report Output Process>

Figure 11:
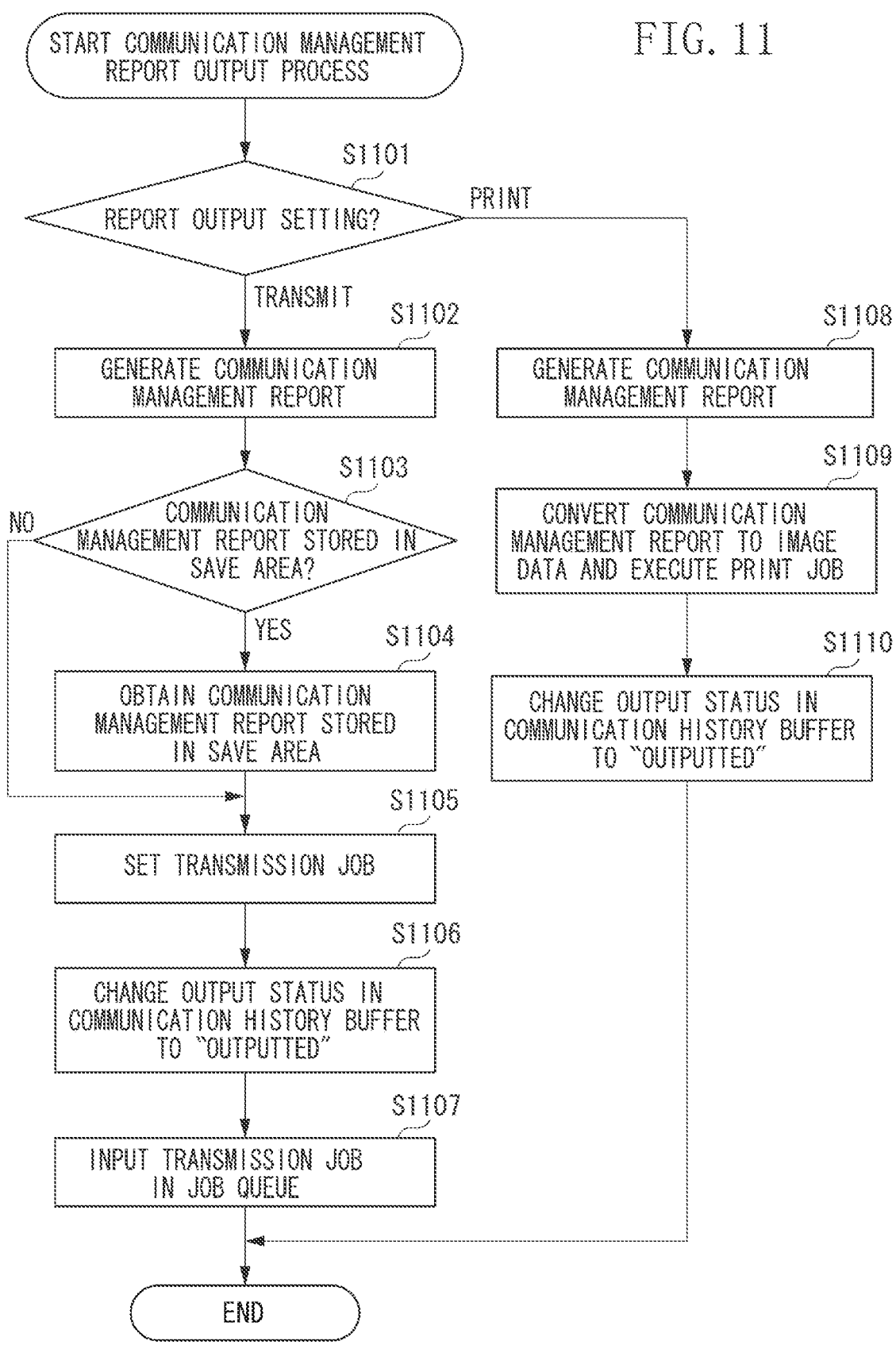
FIG. 11 is a flowchart illustrating a report output operation.

FIG. 11 is a flowchart illustrating in detail the communication management report output process performed in step S506. According to the second exemplary embodiment, the communication management report output process based on the flowchart illustrated in FIG. 11 is performed in addition to the process of the flowchart illustrated in FIG. 7.

Each of the operations (i.e., steps) illustrated in the flowchart of FIG. 11 is realized by the CPU 111 in the MFP 101 executing the control program stored in the ROM 112 or the storage 114.

In step S1101, the CPU 111 determines the setting of the communication management report output method. If the MFP 101 is set to transmit the communication management report to the external device ("TRANSMIT" in step S1101), the process proceeds to step S1102. If the MFP 101 is set to print the communication management report ("PRINT" in step S1101), the process proceeds to step S1108.

The case where the MFP 101 is to print the communication management report will be described below. In step S1108 to step S1110, the CPU 111 executes the communication management report output process similarly as in step S706 to step S708, and the communication management report output process ends.

The case where the MFP 101 is to transmit the communication management report to the external device will be described below.

In step S1102, the CPU 111 generates the communication management report similarly as in step S702. In step S1103, the CPU 111 checks whether the communication management report exists in a save area to be described below. If the communication management report exists (YES in step S1103), the process proceeds to step S1104. If there is no saved communication management report (NO in step S1103), the process proceeds to step S1105. In step S1104, the CPU 111 obtains the communication management report stored in the save area.

The timings of executing step S1103 and step S1104 are not limited to the above. For example, the CPU 111 may previously obtain the communication management report before generating the communication management report in step S1102.

In step S1105, the CPU 111 specifies the settings of the transmission job for transmitting the communication management report to the destination preset via the setting screen illustrated in FIG. 2. More specifically, the CPU 111 sets the destination of the communication management report and the transmission protocol based on the transmission information preset on the communication management report output setting screen (illustrated in FIG. 2). Further, the CPU 111 sets the communication management report generated in step S1102 and the communication management report generated in step S1104 as the data to be transmitted. Furthermore, the CPU 111 sets "YES" to the setting information on whether to save the data (i.e., data save information) as an optional setting of the transmission job.

FIG. 12 illustrates an example of a data structure of a transmission job queue 1200 stored in the storage 114 or the RAM 113. Referring to FIG. 12, the transmission job queue 1200 corresponds to the transmission job queue 400 according to the first exemplary embodiment, and the transmission job has a data save information field indicated as in information 1201 instead of the information 405.

Since the information indicated as the information 401 to the information 404 and the information 406 are similar to those according to the first exemplary embodiment, description will be omitted. The information 1201 is the data save information for determining whether to save the data when performing the error job clear function. In FIG. 12, the case where "YES" is not added to the information 1201 is indicated as "-".

In step S1106 illustrated in FIG. 11, the CPU 111 overwrites "outputted" on the information 606 corresponding to the history information included in the communication management report generated in step S1102. In step S1107, the CPU 111 inputs the transmission job set in step S1105 to the transmission job queue 1200 to be described below. The transmission job input to the transmission job queue is transmitted based on the flowchart of the transmission process illustrated in FIG. 13.

<Transmission Process>

Figure 13:
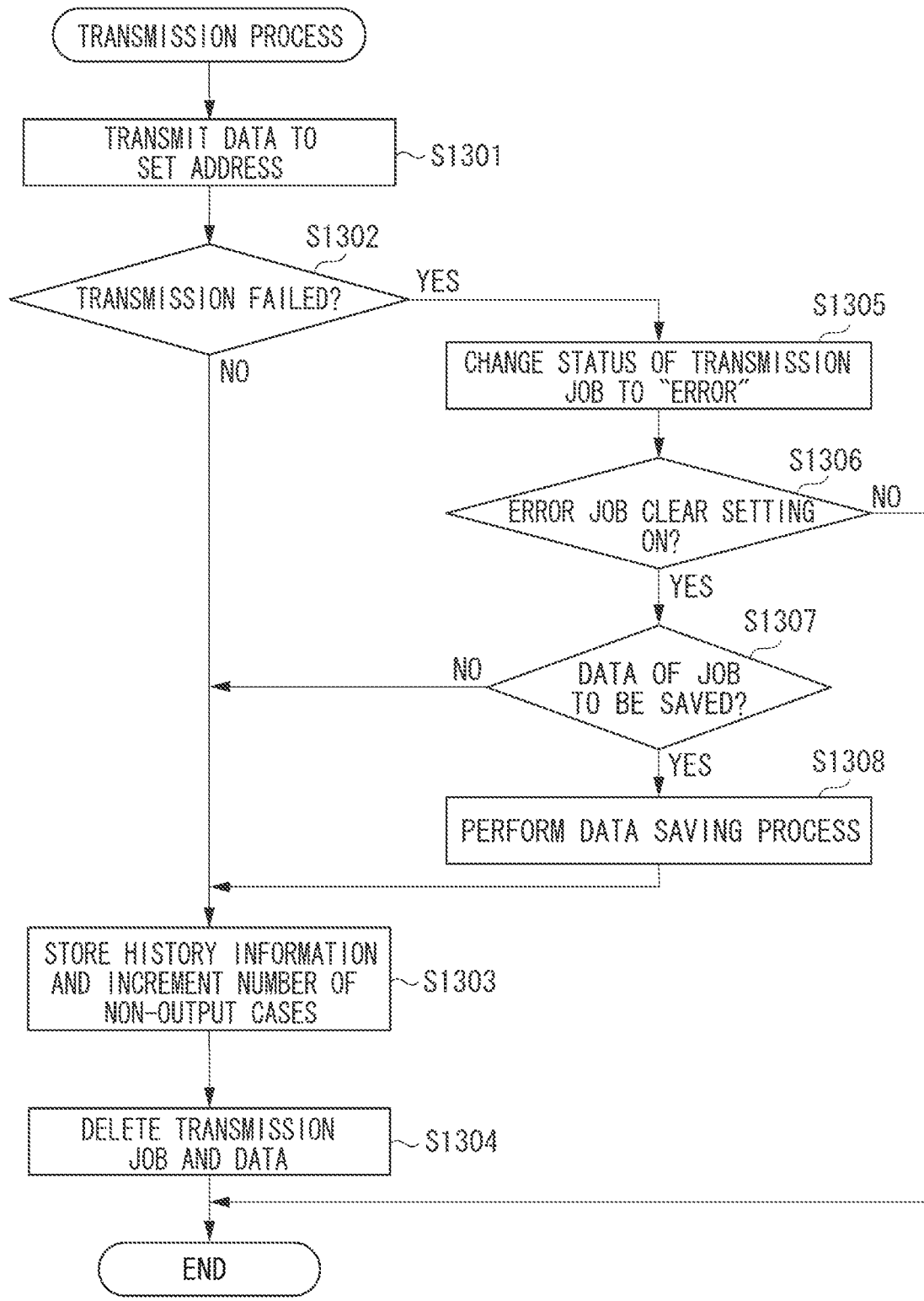
FIG. 13 is a flowchart illustrating the transmission operation.

According to the second exemplary embodiment, the transmission process based on the flowchart illustrated in FIG. 13 is performed instead of the process of the flowchart illustrated in FIG. 8 according to the first exemplary embodiment. FIG. 13 is a flowchart illustrating transmission control performed when transmitting data. The CPU 111 refers to the transmission job queue 1200 and starts the transmission process in the case where there is a transmission job standing by.

According to the present exemplary embodiment, the case where the transmission jobs 410 and 411 are input to the transmission job queue 1200, and the transmission process corresponding to the transmission job 410 is to start will be described as an example.

Each of the operations (i.e., steps) illustrated in the flowchart of FIG. 13 is realized by the CPU 111 in the MFP 101 executing the control program stored in the ROM 112 or the storage 114.

In step S1301 and step S1302, the CPU 111 transmits data to be transmitted to the set destination and determines whether the transmission has failed, similarly as in step S801 and step S802 of the flowchart illustrated in FIG. 8. If the CPU 111 determines that the transmission has not failed (NO in step S1302), the process proceeds to step S1303, and if the CPU 111 determines that the transmission has failed (YES in step S1302), the process proceeds to step S1305. In step S1303, the CPU 111 stores the history information of the executed transmission job in the communication history buffer 600 similarly as in step S803. In step S1303, the CPU 111 deletes the transmission job similarly as in step S804, and the transmission process ends.

In step S1305, the CPU 111 changes the status (i.e., information 406) of the transmission job being executed to "error". In step S1306, the CPU 111 determines whether the error job clear function is valid. If the CPU 111 determines that the error job clear function is valid (YES in step S1306), the process proceeds to step S1307. If the CPU 111 determines that the error job clear function is not valid (NO in step S1306), the transmission process then ends while the transmission job remains as the error job.

In step S1307, the CPU 111 determines whether the transmission job being executed is a job in which the data is to be saved. More specifically, the CPU 111 checks the value of the data save information (i.e., the information 1201) set to the transmission job being executed. If the value of the information 1201 is "YES", the CPU 111 determines that the transmission job being executed is a job in which the data is to be saved (YES in step S1307), and the process proceeds to step S1308. If the value of the information 1201 is not "YES", the CPU 111 determines that the transmission job being executed is not a job in which the data is to be saved (NO in step S1307), and the process proceeds to step S1303. In step S1303, the CPU 111 stores the history information and deletes the transmission job. The transmission process then ends.

In step S1308, the CPU 111 stores the data, which the MFP 101 has failed to transmit, in the save area of the storage 114. According to the present exemplary embodiment, an example of the process for storing the data in the save area will be described below. The CPU 111 determines a directory in which the data is to be stored based on the job name (i.e., the information 402) set to the transmission job. The CPU 111 then stores the data, which the MFP 101 has failed to transmit, in the determined directory. For example, since the job name of the transmission job 410 is "history transmission", a "history transmission" directory directly below the save area directory is selected. The file corresponding to the data, which the MFP 101 has failed to transmit, is thus stored below the "history transmission" directory. The original file name may be used as the file name when storing it in the save area, or the file name may be renamed to the file name in which a character string such as "ERR" is added to the head of the file name.

A directory configuration of the save area and the file name and a file path of the data to be saved are not limited to the above, as long as it is determinable whether the communication management report exists in step S1103 of the flowchart illustrated in FIG. 11.

Upon ending data saving process in step S1308, the process proceeds to step S1303. In step S1303, the CPU 111 stores the history information and deletes the transmission job. The transmission process then ends.

According to the present exemplary embodiment, the information for determining whether to save the data when the error job clear function is to be performed is managed as the information 1201. However, it is not limited thereto. For example, whether to save the data may be determined from the job name input as the information 402.

<Retransmission of Error Job>

The user can check the transmission job input to the transmission job queue 1200 by pressing a job status key (not illustrated) included as the hard key outside of the screen. Further, the user can select the transmission job and instruct deletion or retransmission of the selected transmission job. Since such transmission job status confirmation process is similar to the transmission job status confirmation process illustrated in the flowchart of FIG. 9 according to the first exemplary embodiment, description will be omitted.

If the CPU 111 has failed to transmit the data (YES in step S1302) and determines that the job type is the history transmission from the name of the transmission job being executed (i.e., the information 402), the MFP 101 may be caused to print the communication management report. Further, if the MFP 101 includes a storing box for storing the image data read using the scanner 120 and for reusing the image data, the MFP 101 may store the communication management report in the box.

As described above, according to the present exemplary embodiment, when deleting the job for transmitting the history information, the data of the history information can be saved. Further, when transmitting the history information report, the history information report can be transmitted by including the saved history information data (i.e., the save data). By such a method, the history information can be transmitted without exception.

According to the present invention, the method for outputting the history information, i.e., by printing or by transmission, is previously selected. However, it is not limited thereto. For example, when the communication management report is automatically outputted by satisfying the condition of the designated number of cases or the designated time, both printing and transmission of the history information may be performed.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, the job in which the communication error has occurred is prevented from remaining unnecessarily, and unintentional loss of the history information is prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control method for a data processing apparatus which is capable of executing a transmission job for transmitting data, the method comprising:
   receiving, from a user, a setting as to deleting data of which transmission according to a transmission job has failed;
   storing, in a storage, history information of the executed transmission job;
   storing information, which indicates whether history information has been outputted, in association with each history information;
   generating, in a case where the number of cases of non-outputted history information has reached a predetermined number of cases, report data including the non-outputted history information;
   executing transmission process based on a transmission job; and
   controlling, in a case where the setting has been received and the data of which transmission according to the transmission job has failed is the generated report data, not to delete the report data.

2. The method according to claim 1, further comprising:
   controlling, in a case where a transmission job for transmitting data different from the generated report data is executed, to delete the data of which transmission has failed in accordance with the received setting.

3. The method according to claim 1, further comprising changing, in a case where the report data including the non-outputted history information is generated, the information stored in association with the history information to information indicating that the history information has been outputted.

4. The method according to claim 1, wherein the history information includes at least one of a transmission starting time, a transmission destination, a transmission protocol, and a transmission result.

5. The method according to claim 1, further comprising:
displaying information of each of transmission jobs for which the transmission of the history information has failed;
receiving, from a user, an executing instruction for executing a transmission job for transmitting the history information corresponding to a selection from among the transmission jobs in the displayed information, and
executing the transmission job based on the executing instruction.

6. A data processing apparatus for executing a transmission job for transmitting data;
a storage that stores history information of the executed transmission job;
one or more processors that executes a set of instructions to
receive, from a user, a setting as to deleting data of which transmission according to a transmission job has failed;
store information, which indicates whether history information has been outputted, in association with each history information;
generate, in a case where the number of cases of non-outputted history information has reached a predetermined number of cases, report data including the non-outputted history information;
execute transmission process based on a transmission job; and
control, in a case where the setting has been received and the data of which transmission according to the transmission job has failed is the generated report data, not to delete the report data.

7. The data processing apparatus according to claim 6, wherein the one or more processors further executes the set of instructions to
control, in a case where a transmission job for transmitting data different from the generated report data is executed, to delete the data of which transmission has failed in accordance with the received setting.

8. The data processing apparatus according to claim 6, wherein the one or more processors further executes the set of instructions to
change, in a case where report data including the non-outputted history information is generated, the information stored in association with the history information to information indicating that the history information has been outputted.

9. The data processing apparatus according to claim 6, wherein the history information includes at least one of a transmission starting time, a transmission destination, a transmission protocol, and a transmission result.

10. The data processing apparatus according to claim 6, wherein the one or more processors further executes the set of instructions to
display information of each of transmission jobs for which the transmission of the history information has failed;
receive, from a user, an executing instruction for executing a transmission job for transmitting the history information corresponding to a selection from among the transmission jobs in the displayed information, and
execute the transmission job based on the executing instruction.

* * * * *